UNITED STATES PATENT OFFICE.

AMOS L. LARABEE AND JOSIAH M. JOCELYN, OF LITTLE VALLEY, N. Y.

IMPROVEMENT IN CHEESE-MAKING.

Specification forming part of Letters Patent No. 162,667, dated April 27, 1875; application filed January 16, 1875.

*To all whom it may concern:*

Be it known that we, AMOS L. LARABEE and JOSIAH M. JOCELYN, of Little Valley, in the county of Cattaraugus and State of New York, have invented a new and valuable improvement in the new process for making a durable, wholesome, and palatable cheese from sour skimmed milk and buttermilk, or either of them, and in preserving cheese manufactured from skimmed milk or buttermilk; and we do hereby declare that the following is a full, clear, and exact description of the same.

Our object is to produce a durable, wholesome, and palatable cheese from sour skimmed milk or from buttermilk.

Our process consists in, first, heating the milk to about 80° Fahrenheit, and at this temperature introducing an alkali, such, for instance, as soda, saleratus, potash, or any of the well-known alkaline substances. This neutralizes the acid in the milk and renders the milk sweet. The proportion of alkali used will depend on the amount of acid in the milk. The heat is then increased, and when the milk, which is now sweet, reaches a temperature of about 88° or 90°, the rennet is applied, and the curd is formed and worked in the usual well-known manner, but more rapidly than in making cheese from new milk. We do not continue the heating after the curd is separated from the whey. The alkali not only neutralizes the acid in the milk, but it saponifies the grease or cream, which remains in more or less quantities after skimming. The nature of the cream is changed by the alkali, so that it is no longer a fat, and will not become rancid upon exposure to the atmosphere. It is more wholesome and digestible to saponify the fatty matter. Our cheese will not become hard and dry like ordinary cheese, owing to the fact that the alkali, in saponifying the fat, utilizes a certain amount of water in the milk, thus producing moisture in the cheese. The saponifying process can be conducted with sweet milk, thus enabling a person to remove about three-fourths of the cream and then make a good merchantable cheese from new milk.

We claim as our invention—

The process described of manufacturing sweet cheese from sour milk, substantially as specified.

In testimony that we claim the above we have hereunto subscribed our names in the presence of two witnesses.

AMOS L. LARABEE.
     JOSIAH M. JOCELYN.

Witnesses:
 A. H. HOWE,
 E. A. NASH.